United States Patent
Martikka et al.

(10) Patent No.: US 7,905,026 B2
(45) Date of Patent: Mar. 15, 2011

(54) COMPASS DEVICE AND METHOD FOR A COMPASS DEVICE

(75) Inventors: Mikko Martikka, Vantaa (FI); Erik Lindman, Espoo (FI)

(73) Assignee: Suunto Oy, Vantaa (FI)

( * ) Notice: Subject to any disclaimer, the term of this patent is extended or adjusted under 35 U.S.C. 154(b) by 326 days.

(21) Appl. No.: 12/153,505

(22) Filed: May 20, 2008

(65) Prior Publication Data
US 2008/0289203 A1    Nov. 27, 2008

(30) Foreign Application Priority Data

May 21, 2007   (FI) .................................. 20075363

(51) Int. Cl.
*G01C 17/38*    (2006.01)
(52) U.S. Cl. .......................................... 33/356
(58) Field of Classification Search ................ 33/356, 33/357, 358, 359
See application file for complete search history.

(56) References Cited

U.S. PATENT DOCUMENTS

| | | | |
|---|---|---|---|
| 4,300,390 A * | 11/1981 | Shimizu ........................... | 33/361 |
| 6,356,851 B1 | 3/2002 | Young et al. | |
| 6,543,146 B2 * | 4/2003 | Smith et al. ..................... | 33/356 |
| 6,817,106 B2 | 11/2004 | Kato et al. | |
| 6,922,647 B2 * | 7/2005 | Cho et al. ..................... | 33/355 R |
| 2002/0035791 A1 | 3/2002 | Parks et al. | |
| 2002/0100178 A1 * | 8/2002 | Smith et al. ..................... | 33/356 |
| 2006/0010699 A1 * | 1/2006 | Tamura ........................ | 33/355 R |
| 2006/0075646 A1 * | 4/2006 | Parks et al. ..................... | 33/356 |
| 2009/0093981 A1 * | 4/2009 | Withanawasam ............... | 33/356 |
| 2010/0121599 A1 * | 5/2010 | Boeve et al. .................... | 33/356 |

FOREIGN PATENT DOCUMENTS

| | | |
|---|---|---|
| GB | 2 128 749 A | 5/1984 |
| JP | 8-278137 A | 10/1996 |
| JP | 9-325029 A | 12/1997 |
| WO | WO-2005/012835 A3 | 2/2005 |

* cited by examiner

*Primary Examiner* — G. Bradley Bennett
(74) *Attorney, Agent, or Firm* — Birch, Stewart, Kolasch & Birch, LLP (57) ABSTRACT

The invention relates to a method for defining a compass direction by means of an electronic compass device. In the method at least two field components of an external magnetic field are measured, from which a set of data points is formed, which correspond to the different orientations of the device relative to the external magnetic field, so that the location of the data points in a set of co-ordinates depends on the Earth's magnetic field and the magnetic disturbances of the environment. From the data points it is determined whether the set of data points correspond to a measurement, in which the device has remained on the horizontal plane with a predefined accuracy, or the tilting of the device is detected relative to the horizontal plane during measurement and the set of data points is corrected to correspond to a measurement in which the device has remained on the horizontal plane with a predefined accuracy. If the set of data points corresponds to a measurement in which the device has remained on the horizontal plane with a predefined accuracy, or the said correction of the set of data points has been performed, a new compass direction is defined by using the disturbance correction made on the basis of the said set of data points. The invention achieves a practical way of displaying an accurate direction.

36 Claims, 4 Drawing Sheets

COMPASS DEVICE AND METHOD FOR A COMPASS DEVICE

This Nonprovisional application claims priority under 35 U.S.C. §119(a) on Patent Application No(s). 20075363 filed in Finland on May 21, 2007, the entire contents of which are hereby incorporated by reference.

BACKGROUND OF THE INVENTION

1. Field of the Invention

The present invention relates to devices comprising an electronic compass, which comprise electromagnetic sensor means for measuring at least two field components of an external magnetic field, and a processing unit, which is arranged to determine the compass direction on the basis of the measured field components, as well as a suitable method for such devices for determining a compass direction. In particular, the invention relates to wristop devices, but it is also well suited for use in fixed applications, such as in vehicles.

2. Description of Background Art

Electronic compasses are used to show the direction in, for example, cars and in wristop computers. In such compasses there are typically two magnetic-field sensors detecting magnetic-field components at right angles to each other. One such arrangement is disclosed in U.S. publication Pat. No. 6,817, 106.

The sensors are naturally sensitive not only to the Earth's magnetic field, but also to other external magnetic fields and fields induced by the device itself. Magnetizing substances in the vicinity of the device will also shape external magnetic fields, which can also cause deviation in the reading of the compass. Due to such interfering factors, the compass must be calibrated before the actual definition of direction, so that its reading will be accurate. The calibration is thus mainly intended to eliminate the effect of static disturbance factors, arising from the operating environment, on the definition of direction. In the actual direction definition, a problem is, on the other hand, measurement noise, which is mainly caused by the magnetic sensors being tilted away from the horizontal plane. The signal transmitted by them will then not correspond to the real compass direction, but instead a method will be required to take this noise into account. U.S. publications Pat. No. 6,356,851 and 2002/0035791 describe the problem field relating to the calibration of compasses and some methods for performing the actual calibration in vehicle compasses.

The method disclosed in U.S. publication Pat. No. 6,356, 851 is based on searching for the minima and maxima of the sensor readings, the algorithm requiring the device to be moved in such a way that measurement data can be obtained from all the quarters of a circle corresponding to the different directions of the compass. In practice, such calibration is relatively slow and laborious to implement, so that it is not very suitable for use when trekking, for example, and for wristop devices. In order to work reliably, the method also requires a very pure signal.

The method disclosed in US publication 2002/0035791 is based on measuring three pairs of x, y points corresponding to the various orientations of the device and then solving the constants A, B, and C of the equation $x^2+y^2+Ax+By+C=0$ on the basis of the measurements. One drawback of the method is that the said three pairs of points should be relatively far from each other (i.e. so that the triangle formed by them has essentially no obtuse angles), so that the device must be rotated to a relatively great extent in order to make a successful calibration. In addition, the method is mathematically quite ponderous, i.e. it consumes a great deal of power. For the aforementioned reasons, the response times also become unnecessary long.

The offset values of the magnetic sensors change through time, so that at some stage the original calibration will give erroneous directional readings. This is corrected by means of calibration made by the user. Even some wristop computers are known, in which the calibration is performed by the device first being set to the calibration state, then rotated 360 degrees in the hand. From the data collected during this rotation, the centre point of a magnetic circle is defined, which is used to calculate the compass direction on the basis of the new measurements, once the device is in the compass state. A problem with this method is that the calibration is slow and labourious while, if calibration is not performed sufficiently frequently, the directional readings given by the device may not be reliable.

SUMMARY AND OBJECTS OF THE INVENTION

An aim of the invention is to achieve a direction display method that is unnoticed by the user and is equipped with reliable automatic calibration, particularly for wristop computers, as well as a corresponding portable device.

The invention is also intended to create a device with low power consumption and a method for reliably defining a compass direction in different operating conditions. In particular, the intention is to create a new wristop computer, boating computer, or vehicle computer, comprising a compass, which due to its intended use may be exposed to widely varying operating conditions.

The invention is also intended to create a compass device, the calibration of which will be reliable, if the available signal is strongly non-ideal, i.e. contains a great deal of noise, as well as a corresponding method. There is a need for this kind of application especially in wristop computers, in which primarily the spatially 'free' operating environment and also the minimization of the size and power consumption of the device set limits to the quantity and quality of the signal obtained from the magnetic sensors. The term spatially 'free' operating environment refers mainly to the fact that, when the wristop computer is used, deviations from the horizontal plane appear as measurement noise. Thus tilting the device during use will reduce the quality of the signal and thus hinder the calibration of the device and thus the successful definition of the compass direction. The noise produced by tilting is the main source of noise in wristop devices.

On the other hand, the invention is also intended to create a new simpler and rapid compass device when the signal to be processed is of good quality, i.e. has a low noise level.

The invention is based on the idea that, when the compass is used, it is calibrated continuously, depending on whether the measured data is of sufficiently good quality to perform calibration. Thus, in the method according to the invention, in order to define a compass directly using the electronic compass device at least two field components of the external magnetic field are measured, from which a set of data points is formed, which correspond to the various orientations of the device relative to the external magnetic field (the location of the data points in the set of co-ordinates depends on the magnetic field of the Earth and on the magnetic disturbances of the environment).
  it is determined whether the data-point set corresponds to a measurement, in which the device has remained on the horizontal plane with a predefined accuracy, or detecting the tilting of the device relative to the horizontal plane during the measurement and correcting the data-point set to correspond to such measurement, in which the device has remained on the horizontal plane with the predefined accuracy, if the data-point set corresponds to the measurement, in which the device has remained on the horizontal plane with the predefined accuracy, or the said correction of the data-point set has been made, a new compass direction is defined by using the calibration performed on the basis of the said data-point set.

Thus, in the device utilizing the method according to the invention, there is no need at all for a separate calibration state, instead calibration can take place 'on the fly' in the direction-display state when the compass is used, provided the predefined quality criteria of the compass signal are met.

If the device is kept essentially on the horizontal plane during the collection of the data points, the data points will be located roughly on the circumference of a circle. The real compass direction is defined from the point on the circumference of the circle at which the measured data point is located. The location of the circle in the set of co-ordinates, on the other hand, depends on, among other things, the external disturbance fields. Indeed the calibration of the compass primarily refers to an disturbance correction performed relative to such fields. In this case, it is assumed that the orthogonalization of the magnetic sensors, i.e. the sensitivity matrix of the device, is known, i.e. it has, for example, been defined at the factory, generally device-specifically.

According to a preferred embodiment, the method comprises a stage, in which the location of the centre point of the circle in the set of co-ordinates is calculated. Disturbance correction of the compass direction then takes place most preferably by defining the compass direction as the direction of the vector formed by the calculated centre point and one of the said data points. According to an alternative embodiment, the precise location of the centre point is not calculated at all; instead the disturbance correction takes place by deciding on the direction from the data points, on the basis of the local curvature direction of the circumference of the circle. This alternative embodiment can be used if the measurement data is relatively noise-free, i.e. if the device is, for example, permanently installed in a vehicle.

Preferably the device is arranged to detect if the device is tilted excessively during measurement, i.e., if the measurement noise is so great that a reliable disturbance-corrected direction definition cannot be made. In such a case, the device is arranged to notify the user of this, who can repeat the measurement holding the device more on the horizontal plane. On the other hand, according to a second embodiment, on the basis of such a reliability evaluation one of several direction-definition methods is selected, the disturbance immunities of which differ from each other.

According to a particularly preferred embodiment, the processing unit is arranged to accept the defined centre point as the new centre point only if its distance from the previously defined centre point is less than a predefined maximum distance. According to one embodiment, the distance of at least some of the said data points from the centre point of the circle is calculated and compared with the distance of the other said data points from the centre point of the circle.

The device according to the invention for displaying a compass direction comprises electronic sensor means for measuring at least two field components of an external magnetic field, as well as a processing unit, which is arranged to take care of continuous automatic calibration, as described above. The detection of tilt can be detected from the data transmitted by the electromagnetic sensor means, or there can be separate means in the device for detecting tilting.

According to a preferred embodiment, when the signal if of good quality, a direction-definition method made on the basis of three measured data points is used and, when the signal is of lower quality, a direction-definition method made on the basis of four measured data points is used. Both of these direction-definition methods are described by way of example hereinafter. The advantage of the three data-point definition is lower power consumption and a very short response time. The advantage of the four data-point method is its applicability even in a situation, in which the noise level becomes so great that a definition made using the three data-point method will no longer be reliable. Examples of implementation will be described in greater detail hereinafter.

Considerable advantages are gained with the aid of the invention. This is because the calibration of the compass can, with the aid of the invention, be hidden to be unnoticeable by the user as a background operation, which is performed at the same time as the user operates the compass in the normal direction-display state. Only if necessary, i.e. if excessive tilting has been detected during measurement, or previous reliable calibration data is not available (e.g., the compass state has been switched on for the first time after a long interval) the measurement will have to be repeated, for example, at the same time requesting the user to hold the device more on the horizontal plane.

Generally speaking, the new methods described in greater detail in the present application and the devices implementing these methods provide sufficient calibration and/or direction information already with a small movement of the device, in both noisy and less noisy environments. With the aid of these, it is possible to rapidly decide where in the set of magnetic co-ordinates one is and to make the necessary disturbance correction to show the accurate direction.

The embodiments of the invention provide considerable additional advantages. For example, by selecting for use a compass method according to the quality of the measured signal, it is possible to implement a wristop device, which is suitable both for trekking use and for attachment, for example, to a boat or other vehicle. In a boat, for example, the device sometimes stays well in the horizontal plane, but sometimes the tilting is greater, whereby the device will automatically select the compass method on the basis of the measurement data, always minimizing the processor load. Thus the total power consumption is reduced and the response time too is reduced as much as possible, always depending on conditions. Particularly in wristop devices, processors are small and the response times can easily become long, if a processor has many simultaneous tasks. The other tasks of the device can be, for example, taking care of radio traffic with remote sensors and various calculations, such as performing diving decompression algorithms and calculating the exercise effect of sports performances, or calory consumption.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1A:
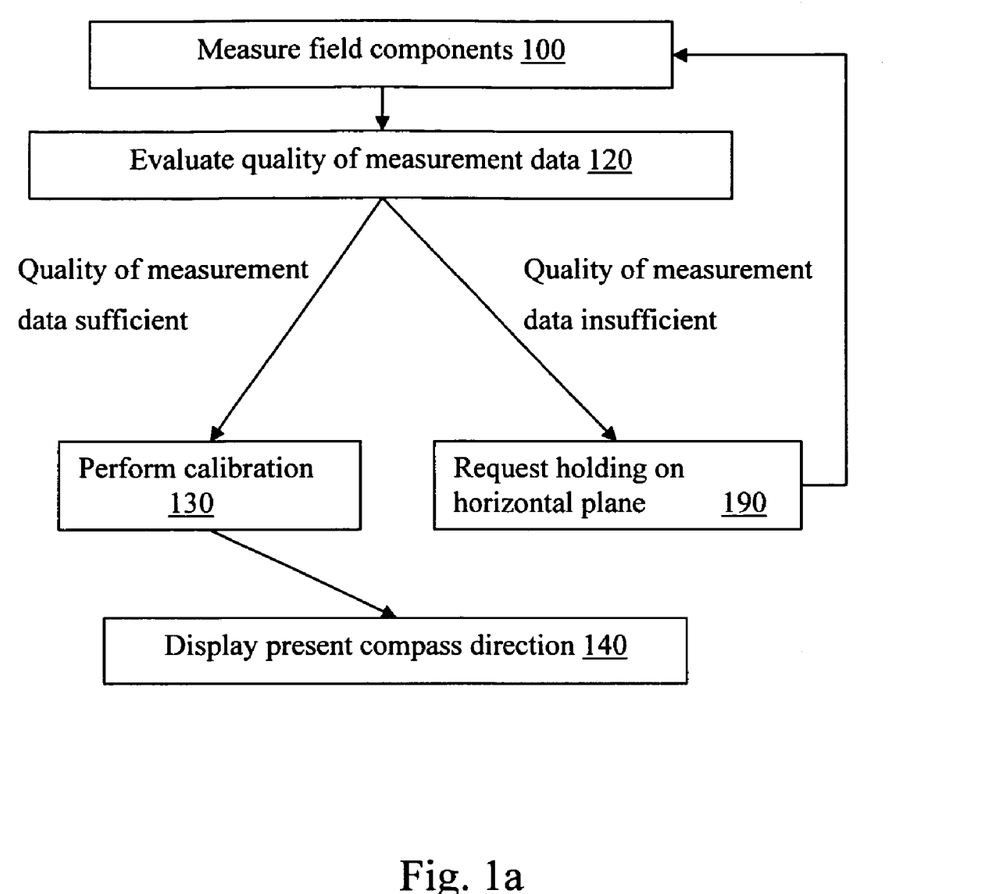
FIG. 1a shows a flow diagram of the method stages according to one embodiment of the invention.

FIG. 1a shows the procedure of the present method according to one embodiment. In stage 100, the magnetic field is measured. The compass device will measure the horizontal components of the magnetic field correctly, only if the magnetic sensors of the device (i.e. generally also the device) are on the horizontal plane. In stage 120 suitable means are used to evaluate the quality of the measurement data. In practice, a sufficiently certain definition of the compass direction will only be obtained, if two consecutive definitions of the zero points of the sensors (calibration measurements of the device) are sufficiently similar. The tilt of the device during measurement, which thus causes measurement noise, is typically estimated with the aid of the difference in the lengths of the horizontal vector during the definition of the zero point and of the previously measured vector. The difference tells the reliability of the latest measurement results. If the difference is less than the limit value, it can be assumed that the device remains on the horizontal plane with sufficient accuracy.

Still referring to FIG. 1a, the following example describes the definition of direction in a practical situation, with the aid of the invention (for example, a wristop device):
1. The user activates the compass display.
2. The device searches for the essential parameters of the previous operating session from its permanent memory: the sensitivity matrix, the centre-point data, and the horizontal-plane intensity of the magnetic field at the time of the previous calibration.
3. The device measures the readings of the magnetic sensors (Stage 100) and calculated their distance from the recorded centre point (sensor readings, if there is no magnetic field).
4. If the distance between the measured point and the centre point differs excessively from the measurement of the previous calibration (Stage 120), the device requests the user to hold the device on the horizontal plane and rotate it on the horizontal plane, e.g., 'Keep level, rotate' (Stage 190).
5. Once the device has been rotated sufficiently on the horizontal plane, the calibration is verified (new centre point, Stage 130) and the direction reading is once again displayed (Stage 140).

The merit of the reading can also be criticized through the difference between the recorded horizontal intensity and the measured intensity, for example, by calculating:

FOM(figure of merit)=abs(measured−recorded)
*100%/recorded

This gives a relative merit factor for the measurement.

Figure 1B:
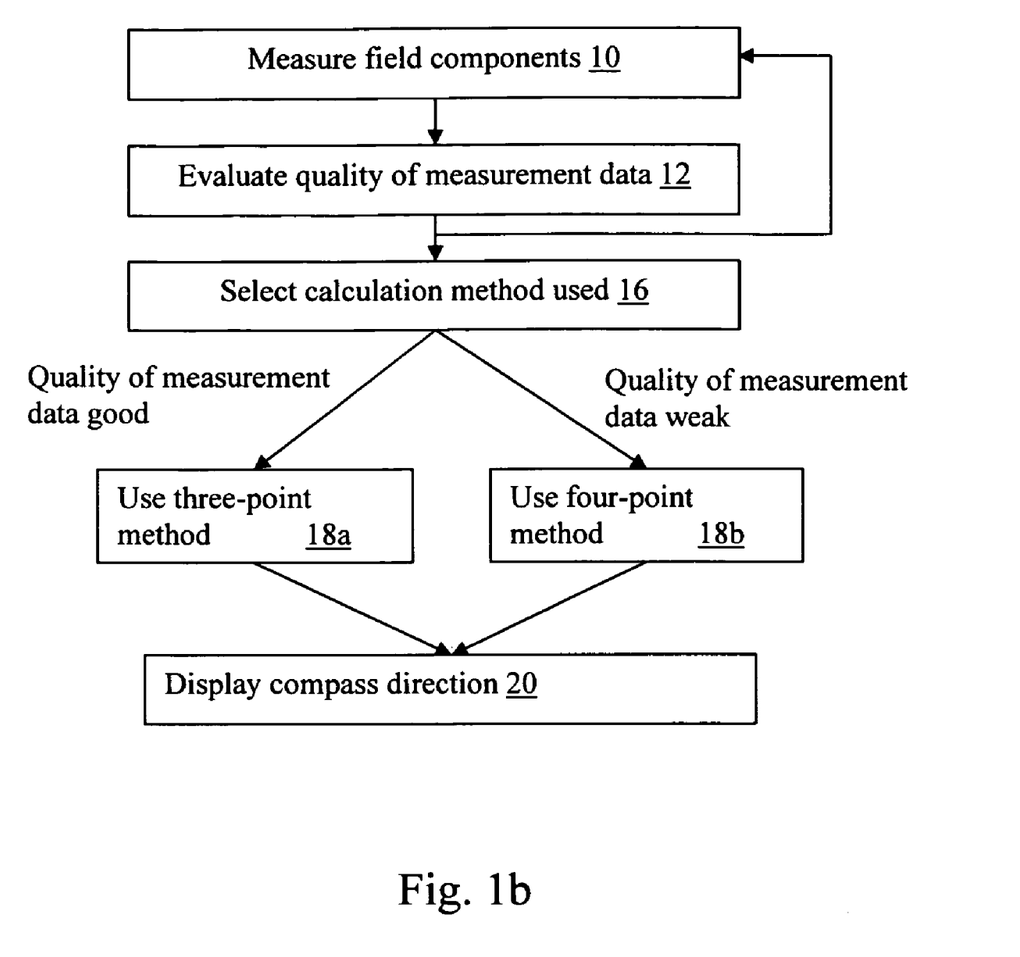
FIG. 1b shows the progress of the method according to a second embodiment.

In FIG. 1b, which depicts a further embodiment of the invention, Stages 10 and 12 correspond to Stages 100 and 120, respectively, of FIG. 1a. After measurement-data quality evaluation 12, if the quality meets a predefined criterion, in Stage 16 it is possible to select for use, for example, the method of compass-direction calculation, described below in greater detail, suitable for a noise-free environment, or some other method of calculation utilizing at most three measurement points (Stage 18a). If, on the other hand, it is ascertained in Stage 12 that the tilt of the device is great, it is possible in Stage 16 to select, for example, the method of compass-direction calculation, described below in greater detail, suitable for a noisy environment, or some other method of calculation utilizing at least four measurement points (Stage 18b). Alternatively, if it is ascertained that the tilt of the device is great, the user can be requested, with the aid of a visual or aural signal, to hold the device better on the horizontal plane and continue the collection of measurement data. In Stage 20, the calculated compass direction is displayed to the user.

In the following, calibration and direction definition are described in detail, in both a noisy and a low-noise operating environment.

Noisy Operating Environment

In a noisy environment, it has been observed that the duration of the rotation movement required for calibration can be minimized best by means of a device, which comprises
- electromagnetic sensor means for measuring at least two field components of an external magnetic field,
- a processing unit, which is arranged to create from the measurement field components two-dimensional data points bound to an origin, which are located roughly on the circumference of a circle, always depending on the relative positions of the sensor means and the external magnetic field, and
- which processing unit is further arranged to determine the centre point of the said circle with the aid of the data points, in order to calibrate the compass, so that the processing unit is arranged to determine the centre point of the circle with the aid of the four data points, by calculating the normals of two segments fitted between these four data points, and defining the centre point of the circle as the point of intersection of the normals.

This is because it has been observed that, by using four data points in place of three data points, the device becomes considerably less sensitive to the errors caused by noise in the definition of the centre point. If, in a three-data-point system, the data point, which is common to both segments, for example in the US publication 2002/0035791, moves due to noise, it will affect the direction of both segments and further accumulatively affect the location of the defined centre point. In the publication referred to above, the new centre point is averaged iteratively with the previous centre point, so that the method is made more reliable, which is not necessary, or generally even desirable in the present method.

The processing circuit is preferably arranged to accept two data points as the end points of a segment only if their distance from each other is greater than a predefined minimum distance, with in a typically application is in the range circle radius/5 ... circle radius. This achieves the advantage that the effect of noise on the direction of the segment (and thus also on its normal) is reduced. For example, end points, the distance from each other is about the circle radius/2, will provide the present method with sufficient accuracy of definition in nearly all practical applications. The present method also permits the distance between the end points to be kept very small without the directional accuracy of the method suffering unreasonably, which saves calculating power (the 'up time' of the sensors) and increases user-friendliness (small rotation and rapid measurement).

Further, the processing circuit is preferably arranged to accept the segments for the definition of the centre point only if the angle between the directions defined by them is greater than a predefined minimum angle, preferably at least about 35 degrees, for example 37-143 degrees (angle cosine <0.8). This achieves the advantage that the error produced by noise in the direction of the segments will not appear too easily in the definition of the centre point.

The processing circuit is preferably arranged to fit the said segments always between consecutive data points, i.e. in such a way that the segments do not intersect.

According to a particularly preferred embodiment, the processing unit is arranged to accept the defined centre point as the new centre point only if its distance from the previously defined centre point is less than a predefined maximum distance, preferably less than about the circle radius/10.

The device is typically arranged to use the defined centre point and the measurement result of the new field components obtained from the electromagnetic sensor means in turn to display the compass direction to the user of the device. This is a usual application, at least in wristop devices, which can thus be used for finding direction in trekking use (cf. e.g. blackbox type solutions, which collect only directional information).

Figure 4:
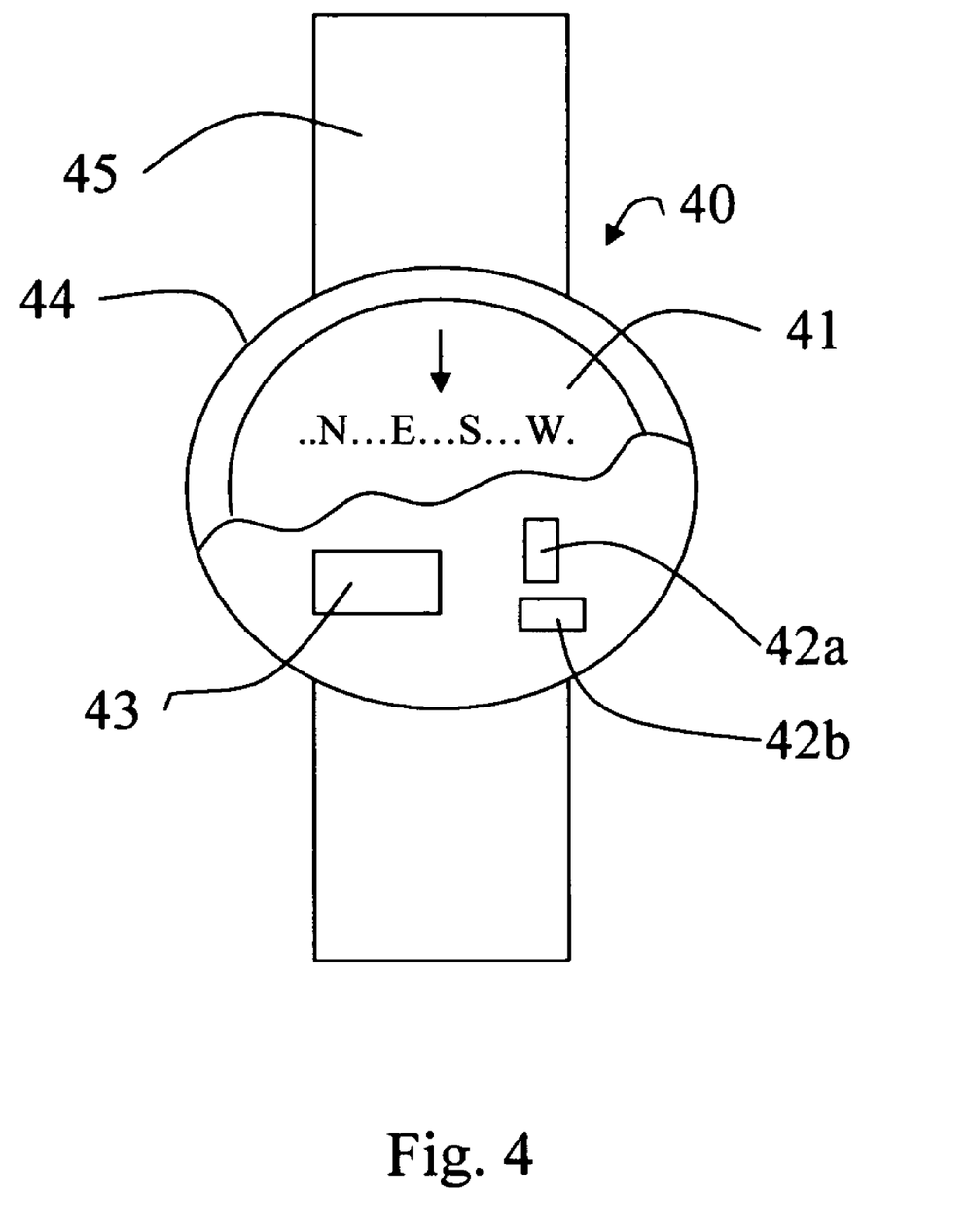
FIG. 4 shows the present invention to be adapted to be worn on an individual's wrist.

With reference to FIG. 4, in the wristop device 40 there is a central module 44, which contains magnetic sensors 42a and 42b and a processing unit 43, and to which a wrist strap 45 is attached. The central module 44 additionally comprises a display face 41, in which there are means for notifying the compass direction visually, typically an LCD/TFT display, or similar.

The device is preferably arranged to display the compass direction to the user of the device only if the new measurement result of the field components corresponds to data points, the distance of which from the centre point of the circle is in the range the previously defined distance of the data point from the centre point of the circle minus a predefined minimum distance ... the previously defined distance of the data point from the centre point of the circle plus the predefined minimum distance. On the other hand, in addition to the compass direction, the device can be arranged to display to the user also the reliability of the defined compass direction, which can be supplemented, or even replaced with the use of the aforementioned distance criterion. Reliability can be estimated on the basis of the measurement results of the field components user in the definition of the centre point and/or the variations in the distances measured from the centre point of the corresponding data points from the measurement result of the new field components, or, for example, according to the signal/noise level of the measurement of the field components.

According to one embodiment, the invention is implemented in a noisy operating environment, such as in a wristop computer, in practice according to the following description.

The sensitivity matrix S of the device, i.e. the amplification and cross-sensitivity factors of the magnetic sensors, when the device is rotated on the horizontal plane, is generally defined already at the factory (so-called factory calibration), so that here it is assumed to be known. Thus, the distortions in the measurement caused by the device itself and its magnetic sensors (as well as possibly the correction, i.e. declination, of the geographical north direction) are entered in the memory of the device. Thus, each measurement result (mx,my) always corresponds to one point $(x,y)=S(mx,my)$, from which the distortions in question have been eliminated. Thus a circle $R^2=(x-x0)^2+(y-y0)^2$, in which R is the radius of the circle and $(x0,y0)$ is the centre point of the circle. In the same way, it is preferably assumed that at least the cross-sensitivity factors do not change substantially during use.

In order to perform calibration, the user of the device must move the device around a direction at right angles to the horizontal plane, i.e. in such a way that the magnetic sensors of the device detect a change in the strength of the magnetic field of the Earth. Preferably an active check is made that the distance of the readings of the magnetic sensors from the centre point of the magnetic circular image remains constant with a sufficient accuracy, so that the device can be concluded to be on the horizontal plane (the strength of the horizontal component of the Earth's magnetic field does not change). Further, only those readings are accepted that have been verified with sufficient certainty to have taken place when the device was in a horizontal orientation.

Figure 2:
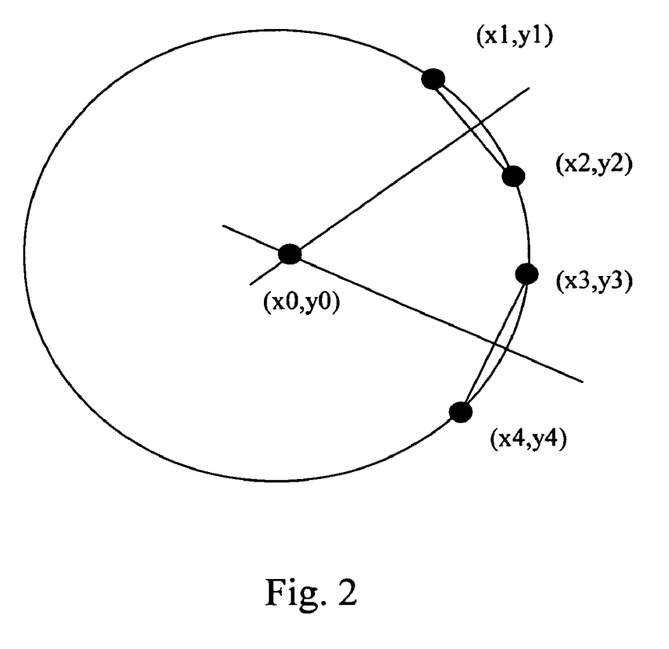
FIG. 2 shows the compass calibration circle and the geometric means used in the calibration, in a noisy environment, according to one embodiment.

Referring now to FIG. 2, which illustrates calibration in the case of a noisy signal, the centre point of the magnetic circular image is sought with the aid of the intersection of the bisectors of two segments. Described more specifically, two separate points located on the circumference of the circle form a segment of the circle. A straight line at right angles to the segment and running through the centre point of the segment runs in the direction of the radius of the circle, i.e. a straight line selected in this manner will also run through the centre point of the circle. If two other points are selected from the circumference of the circle, a second straight line running through the centre point of the circle is obtained. The intersection of those two straight lines is the centre point of the circle.

The present method is then implemented according to a preferred embodiment, in such a way that the strength of the magnetic field is measured at four points, which form two pairs of points, i.e. a first pair of points $(x1,y1)=S(mx1,my1)$ and $(x2,y2)=S(mx2,my2)$ and a second pair of points $(x3,y3)=S(mx3,my3)$ and $(x4,y4)=S(mx4,my4)$, a check is made that the distance between the first and correspondingly second pairs of points from each other is greater than a predefined minimum distance, the angular coefficients (the first and second angular coefficients, corresponding to two radii of the circle (x.y) of the normals of the segment lines (the first and second segment) connecting the first and correspondingly the second pairs of points are calculated, and if the first angular coefficient and the second angular coefficient differ from each other by more than a predefined minimum value, a new centre point $(x0,y0)$ of the circle $(x,y)$ is calculated with the aid of their intersection.

The comparison of the normals of the segment lines can naturally also be replaced by the comparison of the angular coefficients of the segment lines, which will lead to the same end result.

Further, the new calculated centre point $(x0,y0)$ of the circle can be accepted as the new centre point only if its is sufficiently close to the previous value of the centre point.

If the calibration is used in turn to show the direction on the display or similar of the device, the reliability of the method can be further improved by only showing the measured direction to the user of the device, if the point (xs,ys) corresponding to the measured direction is at nearly the same distance from the centre point as the other measured points or points (xn,yn) used in the calibration, and/or the reliability of the defined direction is stated with the direction.

The reliability of the direction can be evaluated, for example, by measuring the noise level of the signal or by evaluating the truthfulness of the measurement by using the previous measurements.

At the same time as the device is calibrated, it is also preferable to calculate the compass direction for display to the user (combined calibration-compass function in a single operating mode). According to a preferred embodiment, at the same time a check is made as to whether the length of the new direction vector differs from the length of the direction vector during the previous selection of the centre point. If the difference is too great, the user is informed of this, for example, by means of an indicator appearing on the display of the device and the direction will then not necessarily be displayed.

In tests, it has been observed that at a 20-% noise level (measured from the distances of the data points from the centre point) the present method can offer a directional accuracy as great as +/−3 degrees.

Noise-Free or Low-Noise Operating Environment

In a noise-free environment, on the other hand, it has been observed that the compass direction can be reliably defined with the aid of even a differentially small rotation movement, even without the definition of the centre point of the calibration circle. This is achieved in such a way that the device comprises electromagnetic sensor means for measuring at least two field components of an external magnetic field, and a processing unit, which is arranged to create two-dimensional data points bound to an origin, from the measured field components, which are located roughly on the circumference of a circle, always depending on the relative positions of the sensor means and the magnetic field, in which case the processing circuit is arranged to calculate the compass direction with the aid of three data points by deciding on the direction of curvature of the circumference of the circle from the local data points and in turn through this the real compass direction. This can be done by defining the direction of the normal of a segment fitted between two data points and in turn by defining the order of the three data points on the basis of the mutual position of the vectors aligned between them, for example, by using the point or cross product between the vectors, in order to define the orientation of the device relative to the compass direction of the external magnetic field.

A method of this kind offers a possibility to define the compass direction even without the definition of the centre point usually used in the calibration of electronic compasses. In addition, the definition can be performed even from differentially small changes in the orientation of the device. It has been observed, that by using integer calculation (circle-image radius 1000 units) a measurement with an accuracy of less that 2 degrees can be performed from a total rotation of even less than 2 degrees, if the noise level is less than 1%. In floating-point calculation with ideal data, it is true that the smaller the rotation, the greater the accuracy, and with the aid of this the accuracy of the method can be further improved. Stated generally, the definition can be made with the aid of data points, the triangle formed by which has a very obtuse angle (e.g., an angle of 135 degrees or greater), but as described above, typically even a considerably smaller rotation of the device will suffice.

Figure 3:
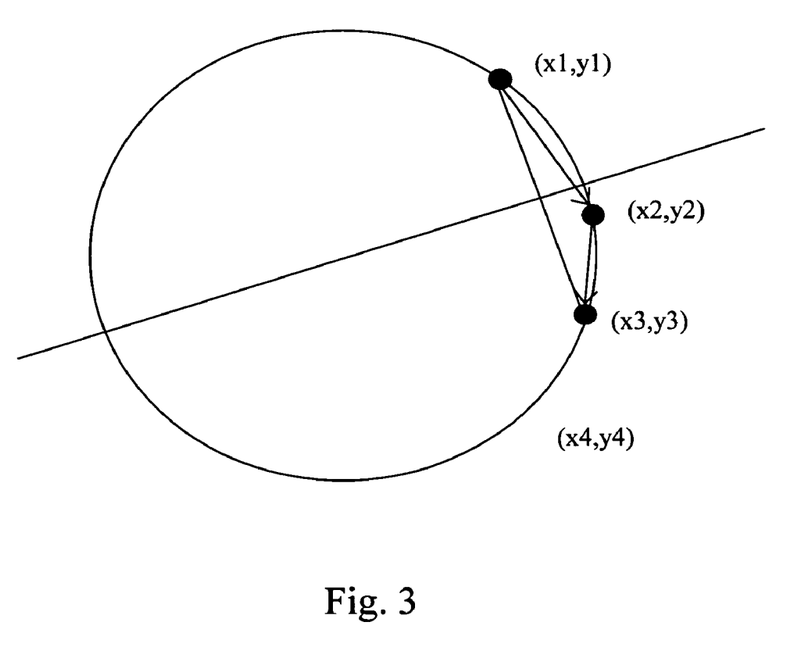
FIG. 3 shows the compass calibration circle and the geometric means used in the calibration, in an environment with no noise, according to one embodiment.

With reference now to FIG. 3, if the measured signal is relatively noise-free (the device is held with good accuracy on the horizontal plane), then differentially small changes in the orientation of the device will be sufficient to define the direction. In such an ideal case, there is no need to define even the centre point of the circle, instead it will be sufficient to examine three consecutive measurement results (x1,y1), (x2,y2), (x3,y3). It is assumed that these measurement results arise when rotating the device in the same direction during measurement. In that case, the normal of the segment defined by the edge-most measurement points (x1,y1) and (x3,y3) defines a straight line running in the direction of the diameter of the circle. After this, a method is used, which tells the curvature of the pattern form by the vectors a=(x1,y1)→(x2, y2) and b=(x2,y2)→(x3,y3), in order to determine the compass direction and/or the location of the centre point. Such as method can be, for example, the calculation of the dot product of the vectors a and b, so that the sign of this will tell in which direction defined by the diameter the device has faced during measurement, and thus the location of the centre point. As one skilled in the art will understand, other mathematical tools and methods too can be used. An example of an alternative method is the definition of the direction of rotation with the aid of a cross product. The final direction can then be determine, for example, in such a way that, always depending on the sign of the vertical component of the cross product (a×b), 90 degrees from the last direction of the measurement vector (vector b) are added/subtracted.

As can be seen from FIG. 3, the processing unit is preferably arranged to fit the said segment between the two outermost data points, i.e. the first and last in order of the said three data points. This minimizes the effect of noise on the direction of the segment.

Further, it can be seen from FIG. 3 that the processing unit is preferably arranged to calculate the cross product between the vectors, in order to define the orientation of the device relative to the external magnetic field, in such a way that the vectors are aligned between the first and second, and correspondingly the second and third data points, in order of collection.

The device is also preferably arranged to display the compass direction to the user. As in the noisy case, in this embodiment too the device can be arranged to also show the user the reliability of the defined compass direction, for example, according to the signal/noise level of the measurement of the field components.

In this embodiment too, factory calibration made on the device is typically utilized.

In devices, which in use can be locked to essentially the horizontal plane, for example, in vehicle compasses, the three-point measurement described above can even be used without detector or definition of tilt.

EXAMPLE

Three-point Measurement

In the three-point case, the direction can be defined thus:

Assume that three consecutive points have been measured from movement rotating in the same direction: points p1=(x1,y1), p2=(x2,y2), and p3=(x3,y3).

Form the vectors $a=(x3-x2)i+(y3-y2)j+0k$ and $b=(x2-x1)i+(y2-y1)j+0k.$ (i, j, and k are unit vectors of an orthogonal (x,y,z) set of co-ordinates.

Calculate the direction k of the vector a:

$k=a \tan 2(y3-y2,x3-x2).$

The z-component of the cross product c=a×b is $z=(x3-x2)(y2-y1)-(y3-y2)(x2-x1)$.

If z>0, add 90 degrees to the calculated direction. If z<0, subtract 90 degrees from the direction. (+ clockwise, − counterclockwise).

The direction k is defined from the latter segment, because it is closer to the correct direction at the time.

Noisy Operating Environment+Tilt Compensation

According to one preferred embodiment, in an operating environment that is, as a point of departure, noisy (e.g. wristop devices), the method designed for a noise-free environment, described above, is also applied. This is achieved in such a way that, in the device, in which the method is implemented, there are means for measuring tilt (e.g., a sensor for measuring the direction of gravity). With the aid of the measured tilt, it is possible to compensate the tilt noise out of the measured magnetic data, after which the three-point direction definition method can be applied. The measurement of tilt can, of course, also be taken into account in other stages of the calculation.

Example

Tilt Compensation

1. Magnetic Measurements

Fetch raw data m1 and m2 from the magnetic sensors.

2. Orthogonalization

If the device is rotated on the horizontal plane, the resulting data set represents a tilted ellipse. To convert this to a circle, a sensitivity matrix is required. In a 2-D case, the sensitivity matrix is $$S = [m\_xx \; m\_yx$$
$$m\_xy \; m\_yy]$$

The values used in the following calculations are vecMeas=[x y]=[m1 m2]*S (or [x y]'=S'*[m1 m2]').

3. Tilt Compensation

If the tilt values of the sensor plane have been measured, the untilted projection of the vector vecMeas can be calculated. For this purpose, the tilt angles tilt y (in the 12 o'clock direction) and tilt x (in the 3 o'clock direction) are required. Without z measurement the vertical component Mz of the magnetic field must be known. The tilt-compensated values are $y=G*(m1*\cos d(a)+m2*\sin d(a)*\sin d(b)-Mz*\sin d(b))$ and $x=G*(-m2*\cos d(b)+Mz*\sin d(a)*\cos d(b))$, in which $G=-1/\cos d(a)/\cos d(b)$, a=tilt y, and
b=a sin d(sin d(tilt x)/cos d(a).

4. Offset of Values x0 and y0 (Centre Point of Circle, Autocalibration)

The offset values are calculated again in the normal compass state. In this case, the calibration is performed with the aid of points, which define two segments. These define two radii, which intersect each other at the offset point.

5. Mz Value

It is sensible to assume that the magnetic field does not change locally during the measurements. Thus is can be required that $(x1-x0)^2+(y1-y0)^2=(x2-x0)^2+(y2-y0)^2$ From this connection, two candidates for Mz are obtained: Mz+ and Mz− (the roots of the second-order polynomial equation $Ax^2+Bx+C$ are $(-B+/-\text{sqrt}(B^2-4*A*C))/2A$. The correct value is the one that appears in all the results.

6. Compass Direction

The compass direction (d) is calculated as follows $d=a\tan 2(y-y0, x0-x)$.

If the matter is of a conventional 2-D compass (without tilt measurement), stages 1, 2, 4, and 6 apply. Thus those parts of the teachings of this example can also be applied to the embodiments described above.

The invention is not restricted to the embodiments described above, but must be interpreted to the full extent of the accompanying claims.

The invention claimed is:

1. A method of defining a compass direction by means of an electronic compass device comprising:
   measuring at least two field components of an external magnetic field, from which a set of data points is formed, which correspond to different orientations of the device relative to the external magnetic field,
   determining whether the set of data points corresponds to a measurement, in which the device has remained on the horizontal plane with a predefined accuracy, and
   if the set of data points corresponds to a measurement in which the device has remained on the horizontal plane with a predefined accuracy, defining a compass direction by using calibration made on the basis of said set of data points,
   wherein the calibration is made by calculating, on the basis of the data points, the center point of the circle defined by the data points and a new compass direction is defined on the basis of the center point, and
   wherein the defined center point is accepted as the new center point only if its distance from the previously defined center point is less than a predefined maximum distance.

2. The method of claim 1, wherein if the set of data points does not correspond to a measurement in which the device has remained on the horizontal plane with a predefined accuracy, a new compass direction is defined by using a calibration made on the basis of a previously collected set of data points.

3. The method of claim 1, wherein if the set of data points does not correspond to a measurement in which the device has remained on the horizontal plane with a predefined accuracy, the user of the compass device is notified of the need for a new measurement, and a new set of data points is measured.

4. A method of defining a compass direction by means of an electronic compass device, comprising:
   measuring at least two field components of an external magnetic field, from which a set of data points is formed, which correspond to the different orientations of the device relative to the external magnetic field,
   detecting tilting of the device relative to the horizontal plane during measurement, with a tilt sensor, or based on said set of. data points, and correcting the set of data points to correspond to a measurement in which the device has remained on the horizontal plane with a predefined accuracy,
   defining a new compass direction by using calibration made on the basis of the corrected set of data points,
   wherein the calibration is made by calculating, on the basis of the data points, the center point of the circle defined by the data points and a new compass direction is defined on the basis of the center point, and wherein the defined center point is accepted as the new center point only if its distance from the previously defined center point is less than a predefined maximum distance.

5. The method of claim 4, wherein if it has not been possible to make the correction successfully, a new compass direction is defined by using a calibration made on the basis of a previously collected set of data points.

6. The method of claim 4, wherein if it has not been possible to make the correction successfully, a user of the compass device is notified of the need for a new measurement, and a new set of data points are measured.

7. The method of claim 1, wherein the center point of the circle is defined on the base of four data points, by calculating the normals of segments fitted between two of the four data points and defining the center point of the circle as the intersection point of the normals.

8. The method of claim 7, wherein two data points are accepted as the end point of a segment only if their distance from each other is greater than a predefined minimum distance.

9. The method of claim 7, wherein the segments are accepted for the definition of the center point only if the angle between the directions defined by them is greater than a predefined minimum angle.

10. The method of claim 7, wherein the segments are fitted between data points that are temporally consecutive.

11. The method of claim 1, wherein the defined center point is used in turn for displaying the compass direction visually.

12. The method of claim 11, wherein the compass direction is displayed only if the new measurement result of the field components corresponds to a data point, the distance of which from the center point of the circle is in the range the distance of the previously defined data point from the center point of the circle minus the predefined maximum distance to the distance of the previously defined data point from the center point of the circle plus the predefined maximum distance.

13. The method of claim 11, wherein in addition to the compass direction, the reliability of the defined compass direction is also displayed.

14. The method of claim 8, wherein the reliability is calculated on the basis of variations of the data points used in the definition of the center point and/or of the measured distances of the center point of the data points corresponding to the measurement results of the new field components.

15. The method of claim 1, wherein the calibrated compass direction is defined on the basis of three data points by defining locally the direction of curvature of the circular arch formed by the data points.

16. The method of claim 15, wherein the direction of curvature of the circular arch is defined by defining the direction of the normal of a segment fitted between two data points and further defining, on the basis of the order of the three data points and of the mutual positions of the vectors aligned between them, the orientation of the device relative to the external magnetic field.

17. The method of claim 16, wherein said segment is fitted between the two outermost data points, that is the first and last in order of said three data points.

18. The method of claim 12, wherein the direction of curvature of the curve of the circle is defined on the basis of vectors aligned between the first data point and second data point, and correspondingly the second data point and the third data point in order of the data points.

19. The method of claim 15, wherein said three data points form an obtuse-angled triangle, in which one angle is at least 135 degrees.

20. The method of claim 1, wherein said data points are formed by scaling the measurement results of the field components on a sensitivity matrix specific to the compass device.

21. The method of claim 1, wherein it is performed in a wrist-top device.

22. The method of claim 21, wherein the wrist-top device is a wrist-top computer.

23. The method of claim 1, wherein it comprises a stage, in which one of at least two compass-direction definition methods is selected, on the basis of selection information available from the user of the device, or of automatic evaluation of the reliability of the measurement of said field components, and further that the compass direction is defined using the selected method.

24. The method of claim 23, wherein, if the reliability of the measurement of the field components is poorer than a predefined threshold value, a first compass-direction definition method is used, in which data points formed by said two field components corresponding to at least four different orientations of the device are utilized.

25. The method of claim 24, wherein a compass-direction definition method is used.

26. The method of claim 23, wherein if the reliability of the measurement of the field components is better than a predefined threshold value, a second compass-direction definition method is used, in which data points formed by said two field components corresponding to at least three different orientations of the device are utilized.

27. The method of claim 1, wherein a compass-direction definition method is defined on the basis of three data points by defining locally the direction of curvature of the circular arch formed by the data points.

28. The method of claim 1, wherein data points are collected continuously, in order to define a new compass direction while the device is in the direction-display state, in which case the calibration too is performed on the basis of the data points collected in the direction-display state.

29. Electronic compass device comprising:
electromagnetic sensor means for measuring at least two field components of an external magnetic field, and
a processing unit, which is arranged
to form two-dimensional data points from the at least two field components obtained from the sensor means, the data points corresponding to different orientations of the device relative to the external magnetic field,
to determine whether the set of data points corresponds to a measurement, in which the device has remained on the horizontal plane with a predefined accuracy, and
if so, to define a new compass direction by using calibration made on the basis of said set of data points,
wherein the processing unit is arranged to calculate, on the basis of the data points, the center point of a circle defined by the data points, and in turn to define a new compass direction on the basis of the center point, and
wherein the defined center point is accepted as the new center point only if its distance from the previously defined center point is less than a predefined maximum distance.

30. An electronic compass device, which comprises:
electromagnetic sensor means for measuring at least two field components of an external magnetic field,
a processing unit, which is arranged
to form two-dimensional data points from the at least two field components obtained from the sensor means, the data points corresponding to different orientations of the device relative to the external magnetic field, to determine the amount of tilt of the device relative to the horizontal plane during measurement, from a tilt sensor, or based on the set of data points, to correct the set of data points to correspond to a measurement, in which the device has remained on the horizontal plane with a predefined accuracy, and to define a compass direction by using calibration made on the basis of the corrected set of data points;

wherein the processing unit is arranged to calculate, on the basis of the data points, the center point of the circle defined by the data points, and in turn to define a new compass direction on the basis of the center point, and wherein the defined center point is accepted as the new center point only if its distance from the previously defined center point is less than a predefined maximum distance.

31. The device of claim 29, wherein the processing unit is further arranged to wait for a new set of data points, and, at the same time notifying the user of the compass device of the need for a new measurement, if the set of data points does not correspond to a measurement, in which the device has remained on the horizontal plane with a predefined accuracy, and it has not been possible to make said correction successfully.

32. The device of claim 29, wherein it is arranged to measure the external magnetic field continuously, in a single operating state for both calibration and direction definition.

33. The device of claim 29, wherein the processing unit is arranged to define the center point of the circle with the aid of four data points by calculating the normals of segments fitted between these four data points, and to define the center point of the circle, at the intersection point of the normals.

34. The device of claim 29, wherein the processing unit is arranged to defined the compass direction on the basis of three data points by defining locally the curvature of the circular arch formed by the data points, preferably by defining the direction of the normal of a segment fitted between two data points, and in turn, on the basis of the order of three data points the mutual positions of vectors aligned between them, defining the orientation of the device relative to the magnetic field of the Earth.

35. The device of claim 29, wherein it is a wrist-top device.

36. The device of claim 29, wherein the wrist-top device is a wrist-top computer.

* * * * *